United States Patent
Lam et al.

(10) Patent No.: US 7,857,404 B2
(45) Date of Patent: Dec. 28, 2010

(54) CORNER FITTING

(75) Inventors: Harn Lian Lam, Perak (MY); Harn Yan Lam, Perak (MY)

(73) Assignee: Harn Marketing SDN. BHD., Ipoh, Perak (MY)

( * ) Notice: Subject to any disclaimer, the term of this patent is extended or adjusted under 35 U.S.C. 154(b) by 504 days.

(21) Appl. No.: 11/948,588

(22) Filed: Nov. 30, 2007

(65) Prior Publication Data

US 2008/0315740 A1    Dec. 25, 2008

(30) Foreign Application Priority Data

Dec. 15, 2006   (MY) ............................... PI20064697

(51) Int. Cl.
*A47B 88/00* (2006.01)
(52) U.S. Cl. .................. 312/348.2; 312/263
(58) Field of Classification Search .......... 312/348.1, 312/348.2, 348.4, 263, 111
See application file for complete search history.

(56) References Cited

U.S. PATENT DOCUMENTS

| | | | |
|---|---|---|---|
| 3,901,572 A | 8/1975 | Litchfield | |
| 4,042,288 A * | 8/1977 | Litchfield | 312/348.2 |
| 4,099,815 A * | 7/1978 | Cox et al. | 312/348.2 |
| 4,108,520 A * | 8/1978 | Litchfield | 312/348.2 |
| 4,128,284 A * | 12/1978 | King | 312/348.2 |
| 4,277,122 A | 7/1981 | Bargiel | |
| 4,279,455 A | 7/1981 | Santo | |
| 4,303,289 A * | 12/1981 | Hardy | 312/348.2 |
| 4,691,970 A * | 9/1987 | Neri | 312/263 |
| 5,221,134 A * | 6/1993 | Grass | 312/348.2 |
| 5,466,061 A * | 11/1995 | Lautenschlager | 312/348.2 |
| 5,538,339 A | 7/1996 | Rock et al. | |
| 5,588,730 A * | 12/1996 | Rock et al. | 312/348.2 |
| 5,870,868 A * | 2/1999 | Kita et al. | 312/140 |
| 6,053,593 A * | 4/2000 | Rock | 312/348.2 |
| 6,938,784 B2* | 9/2005 | Yang | 312/348.2 |

FOREIGN PATENT DOCUMENTS

| | | | | |
|---|---|---|---|---|
| DE | 20307353 U1 | 9/2004 | | |
| EP | 12030 | * 6/1980 | ............. | 312/111 |
| EP | 289256 | * 11/1988 | ............. | 312/348.1 |
| EP | 0790021 A | 8/1997 | | |
| FR | 2312215 A | 12/1976 | | |
| FR | 2505634 | 11/1982 | | |
| GB | 1604245 | 12/1981 | | |
| GB | 2224637 A | 5/1990 | | |

* cited by examiner

*Primary Examiner*—Hanh V Tran
(74) *Attorney, Agent, or Firm*—Volpe and Koenig P.C.

(57) ABSTRACT

A corner fitting for securing a drawer side to a drawer rear panel in a drawer assembly. The fitting comprises a substantially L-shaped bracket having a first flange and a second flange. A hollow support structure connects the first and second flanges and provides internal support surfaces for engagement by a component of the drawer assembly. A slot is defined by a gap between opposing surfaces of one of the flanges and one of the support surfaces. The support structure includes a resilient locking flap biased so as to protrude into the slot to lock the component of the drawer assembly and a tab extending from the flap into the hollow support structure with the tab accessible externally of the drawer assembly to permit retraction of the flap from the slot.

26 Claims, 21 Drawing Sheets

CORNER FITTING

FIELD OF INVENTION

The invention relates to a corner fitting for use in a knockdown drawer assembly and more particularly a fitting for fixing the drawer sides to the rear panel of the drawer assembly.

BACKGROUND

Drawer assemblies are often designed to be knocked down for the purposes of ease of transportation or flexibility of configuration. The knocked down parts of drawers of this type must be easily assembled by the general public without the requirement of specialized tools or skills. Known knockdown drawer assemblies generally consist of a bottom panel, a front panel, a back panel and a pair of side panels affixed to and extending parallel between the front and rear panels as well as engaged with the bottom panel along its longitudinal length.

With new construction materials and methods, drawers are no longer solely made from wood or wood products; other materials such as formed sheet metals or plastic moldings are increasingly being used. It is now common to have a drawer assembled with parts made from a variety of materials. Particularly, it is becoming increasingly known for drawer side panels to be made from sheet metal and assembled with front, back and bottom panels that may be made from the same metal material or other materials, such as wood, for example.

For such drawer assemblies, it is therefore necessary to provide suitable fittings for securely affixing such side panels to both the drawer front and back panels.

An existing corner fitting for fixing drawer sides to a drawer rear panel was disclosed in Malaysian patent application no. PI 20021816. The existing corner fitting comprises an L-shaped bracket for engaging the corner fitting with a drawer side via an angle bracket and a rear panel fitting for securing the corner fitting to a drawer rear panel.

The angle bracket is attached onto the drawer side by way of spot welding, screws, bolts, nuts or any other suitable means. The L-shaped bracket is provided with an integral guide bracket on the inner face of the major flange. A triangular bracket having an L-shaped guide is disposed at the lower corner of the vertical marginal edge joining the major and minor flanges. The integral guide bracket together with the L-shaped guide of the triangular bracket form a first recess for slidably receiving a side flange of the rear panel fitting. A resilient extension, for locking the side flange inserted into the first recess, is provided on the inner face of the major flange. The extension projects away from the inner face in a direction parallel with the drawer rear panel. A second recess is formed on the outer face of the L-shaped bracket for slidably mounting the L-shaped bracket onto the vertical flange of the angled bracket.

From the above description, this prior corner fitting comprises three separate components, namely, the side panel mounting bracket (angle bracket), the L-shaped bracket and the rear panel mounting bracket (rear panel fitting), for engaging a drawer side to the drawer rear panel. This is obviously undesirable as such a corner fitting is costly to manufacture and time-consuming to assemble. Thus, it would be desirable to have a corner fitting consisting of a single component for engaging a drawer side to the drawer rear panel.

Such a single component corner fitting is disclosed in U.S. Pat. No. 4,279,455.

For use with the corner fitting of this U.S. patent, the drawer front panel is provided with a pair of vertical grooves of female dove-tail configuration on its inner face, each groove located adjacent and disposed parallel with a respective vertical marginal edge. Each side panel has one marginal edge of male dove-tail construction adapted to be received in the respective vertical groove of the front panel. Further, each side panel is provided with a groove disposed on its inner face, located adjacent and parallel to the opposite vertical marginal edge. The rear panel is provided with a pair of vertical grooves on its inner face, each groove located adjacent and parallel with a respective vertical marginal edge.

The drawer side panels are secured to the rear panel by way of retainers (corner fittings). The retainers are essentially an L-shaped bracket comprising a pair of first members (outer members) connected along a marginal edge and extending from one another at a substantially right angle, and a pair of second members (inner members) connected along a marginal edge and extending from one another at a substantially right angle. The first and second members are spaced apart and connected by an elongate web at their marginal edges so as to form panel receiving channels therebetween. Tabs are provided on the second members. These tabs are disposed to extend toward the first members and are adapted to be received in the grooves adjacent and parallel to the vertical marginal edges of the side and rear panels.

An obvious disadvantage of the prior corner fitting (retainer) of the above U.S. patent is that it is confined for use with drawer assemblies having wood or pressboard panels, only. As afore-mentioned, it is both common and desirable to have drawer assemblies comprising panels made from a variety of materials such as metal, plastic moldings or wood. Therefore, when using the prior fitting of this U.S. patent, the user's flexibility in terms of materials and/or design of the drawer assembly, is restricted.

This invention thus aims to alleviate some or all of the problems of the prior art, and to provide a single component corner fitting that accords the user flexibility in terms of materials and/or design as well as ease in assembly of drawer sides to a drawer rear panel, without the use of special tools or skill

SUMMARY

In accordance with an aspect of the invention, there is provided a corner fitting, for securing a drawer side to a drawer rear panel in a drawer assembly. The fitting comprises a substantially L-shaped bracket having a first flange and a second flange as well as a hollow support structure that connects the first and second flanges and provides internal support surfaces for engagement by a component of the drawer assembly that serves to conceal the support structure on the inside of the drawer assembly. A slot is defined by a gap between opposing surfaces of one of the flanges and one of the support surfaces. The support structure includes a resilient locking flap biased so as to protrude into the slot to lock the component of the drawer assembly. A tab extends from the flap into the hollow support structure with the tab accessible externally of the drawer assembly to permit retraction of the flap from the slot.

In an embodiment of the invention, the hollow support structure further comprises walls on three sides and a fourth open side through which the tab is accessible. The fourth open side of the support structure may be located between the first and second flange. The gap may be defined between the first flange and a sidewall of the support structure adjacent the first flange.

In another embodiment, the resilient locking flap is provided on a side wall of the support structure.

According to a further embodiment, the resilient locking flap comprises a protruding portion of a side wall of the support structure.

In yet another embodiment, the internal support surfaces for engagement by the component of the drawer assembly are provided by side walls of the support structure.

In a further embodiment, the tab further comprises an extension that is depressible manually for retracting the flap from the slot.

Alternatively, the tab may comprise an opening into which a handheld tool may be inserted for retracting the flap from the slot.

According to another embodiment, the bracket is adapted to be oriented such that the first flange is parallel with a drawer side and the second flange is parallel with the drawer rear panel. The first flange may further comprise an opening provided on its bottom surface for connecting the bracket with a drawer side. The second flange may further comprise at least one opening through which a fastener, for connecting the bracket with a longitudinal end of the drawer rear panel, can pass.

According to yet another embodiment, the bracket is adapted to be oriented such that the first flange is parallel with the drawer rear panel and the second flange is parallel with a drawer side. The second flange may further comprise an opening provided on its bottom surface for connecting the bracket with a drawer side. The first flange may further comprise at least one opening through which a fastener, for connecting the bracket with a longitudinal end of the drawer rear panel, can pass.

In an embodiment, the bracket is made of plastic material. It may be a single molded piece.

According to another aspect of the invention, a drawer assembly includes a rear panel and two drawer sides, each side joined to one longitudinal end of the rear panel by a respective corner fitting as defined above. Each drawer side may be double-walled and comprise a cover portion that fits over an elongate member. The drawer rear panel may be made of wood or sheet metal. It may further comprise railing supporters.

The component of the assembly engagable with the support structure may comprise a cap for covering the corner fitting.

Further, the component of the assembly engagable with the support structure may comprise a drawer rear panel.

Additionally, the component of the assembly engagable with the support structure may comprise a railing supporter.

The corner fitting of this invention can consist of a single component and advantageously enables a drawer side to be engageable with a drawer rear panel without requiring either a side panel mounting bracket and/or a rear panel mounting bracket.

Additionally, the corner fitting of this invention is usable in a drawer assembly having components (panels) made from a variety of materials such as wood, metal, plastic moldings, for example.

Further, in use, the corner fitting of this invention is also easily installed within a drawer assembly, without the use of special tools or skill.

BRIEF DESCRIPTION OF THE DRAWINGS

The invention is illustrated, although not limited, by the following description of embodiments made with reference to the accompanying drawings in which.

DETAILED DESCRIPTION OF THE PREFERRED EMBODIMENTS

Figure 1:
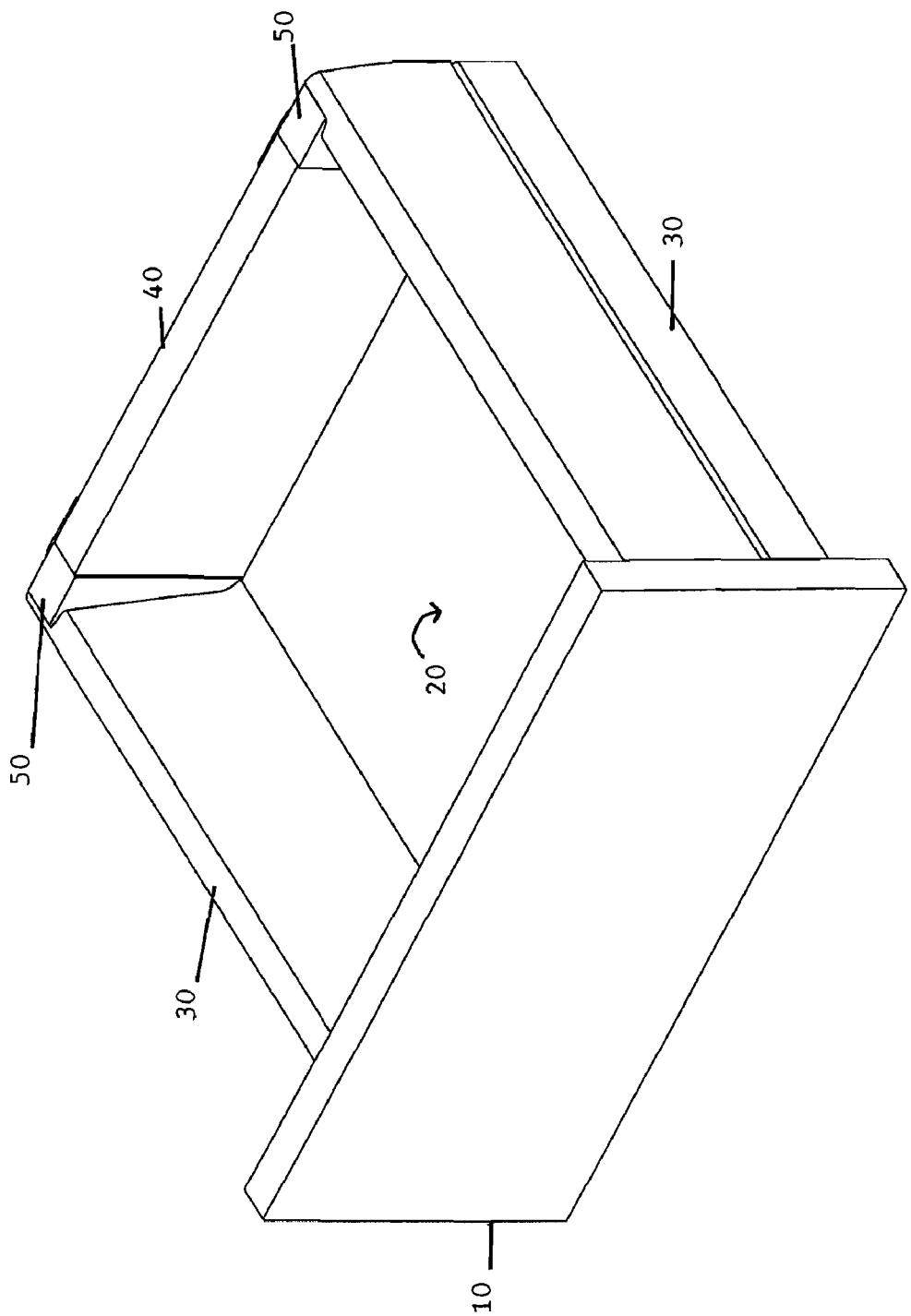
FIG. 1 shows a front perspective view of a drawer assembly with a corner fitting of a preferred embodiment, for fixing each drawer side to a respective longitudinal end of the drawer rear panel.
Figure 2:
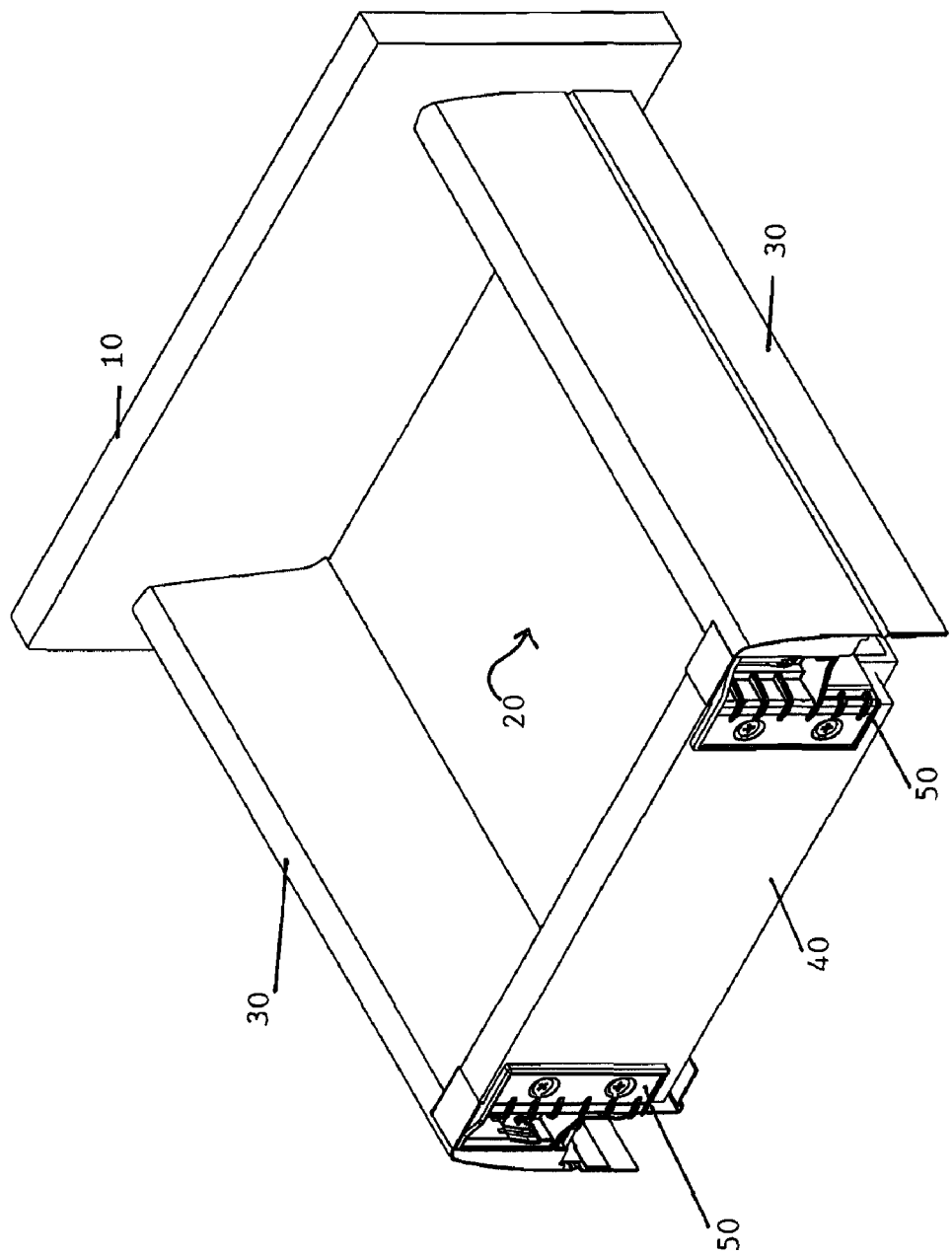
FIG. 2 is a rear perspective view of the drawer assembly of FIG. 1.

FIGS. 1 and 2 show a drawer assembly comprising a front panel 10, a rear panel 40, a bottom panel 20 as well as drawer sides 30 extending between the front and rear panels at each side of the drawer assembly. The bottom 20 and front panels 10 of the drawer are joined to the drawer sides 30 in a conventional manner. Each drawer side 30 is fixed to a longitudinal end of the drawer rear panel 40 by a corner fitting 50.

As shown in FIGS. 4, 5, 7, 8, 9 and 11, the drawer sides 30 are of the "double-walled" type, preferably made of metal, with each side typically comprising a cover portion 31 of generally U-shaped section that fits over an elongate member 32. At its rear longitudinal end, the elongate member 32 is provided with an aperture 33 through which a screw may be inserted for connecting the elongate member (drawer side) to the corner fitting 50. A pair of holes 34 flanking the aperture 33 and disposed diagonal to each other is also provided at the rear longitudinal end of the elongate member 32.

One embodiment of the corner fitting 50 is seen in FIGS. 3A to 3F. This corner fitting comprises a substantially L-shaped bracket having a first flange 60 and a second flange 70 with a support structure 80 connecting the first and second flanges provided therebetween. The bracket is preferably made from a single molded plastic piece.

The first flange 60 has a trapezium-shaped cross section with outer 61 and inner walls 62 that slope away from a central top portion 63. A centrally located aperture 64 is provided on the bottom surface of the first flange 60 for receiving a screw, when the bracket is secured onto the elongate member 32 of a drawer side 30. Two locators 65 are provided on either side of the central aperture 64 and diagonal from each other. The locators 65 ensure that the bracket does not rotate while the screw is being tightened. The inner wall 62 of the first flange 60 extends over a fraction of the outer wall 61 length resulting in the end of the first flange 60, adjacent the support structure 80, having a "cut-out". An opening 66 is provided on the outer wall 61 with the opening located adjacent the cut-out. A portion of the support structure 80, connecting the first 60 and second flanges 70, is located within the first flange cut-out.

The hollow support structure 80 is a substantially rectangular housing and comprises walls 81, 82, 83 on three sides with a fourth open side, a web-like top portion 84 and a web-like floor portion 85. Side walls 81 and 83, adjacent the first 60 and second flanges 70, respectively, extend in a direction parallel to the first flange 60. Side wall 82, between side walls 81 and 83, extends in a direction perpendicular to the first flange 60. These three side walls 81, 82, 83, external of the support structure recess, provide internal support surfaces for engagement by a component of the drawer assembly. The external surfaces of side walls 82 and 83 are preferably provided with friction-reducing grooves for ease of engagement by the drawer component. The fourth side, located between the first 60 and second flanges 70, opens at the rear of the corner fitting 50. When the fitting 50 is assembled with the drawer assembly, this fourth open side allows the support structure recess to be accessible externally of the drawer assembly.

Figure 3:
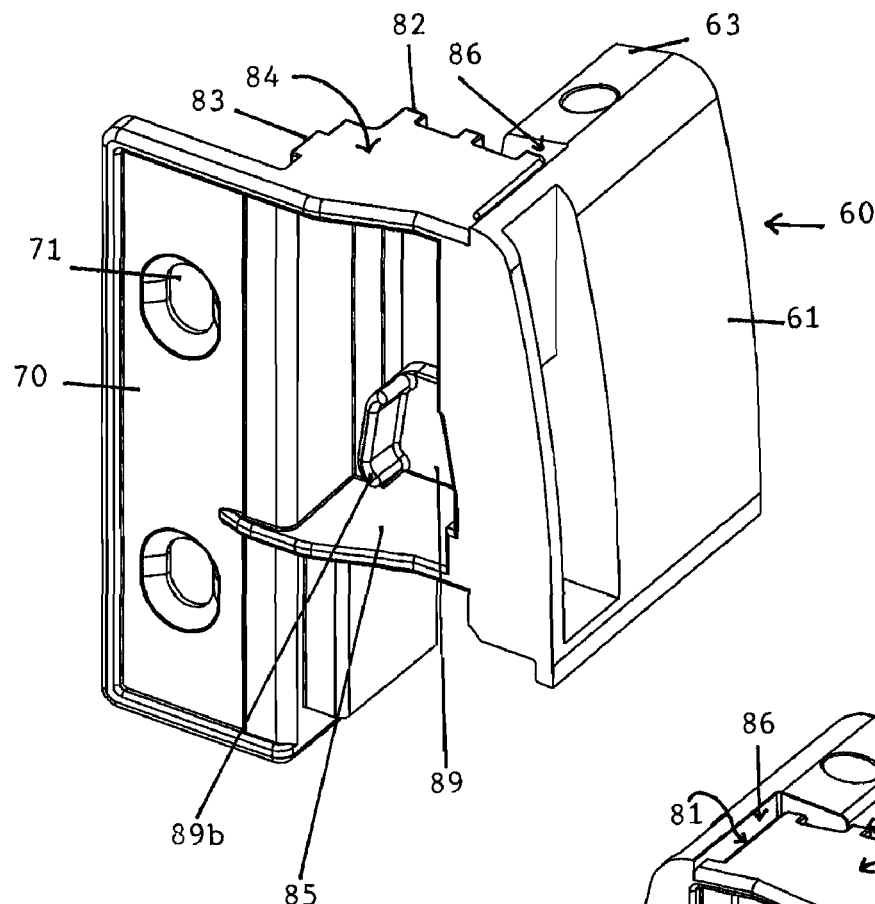
FIG. 3 is a rear perspective view of the corner fitting of a preferred embodiment.
Figure 3A:
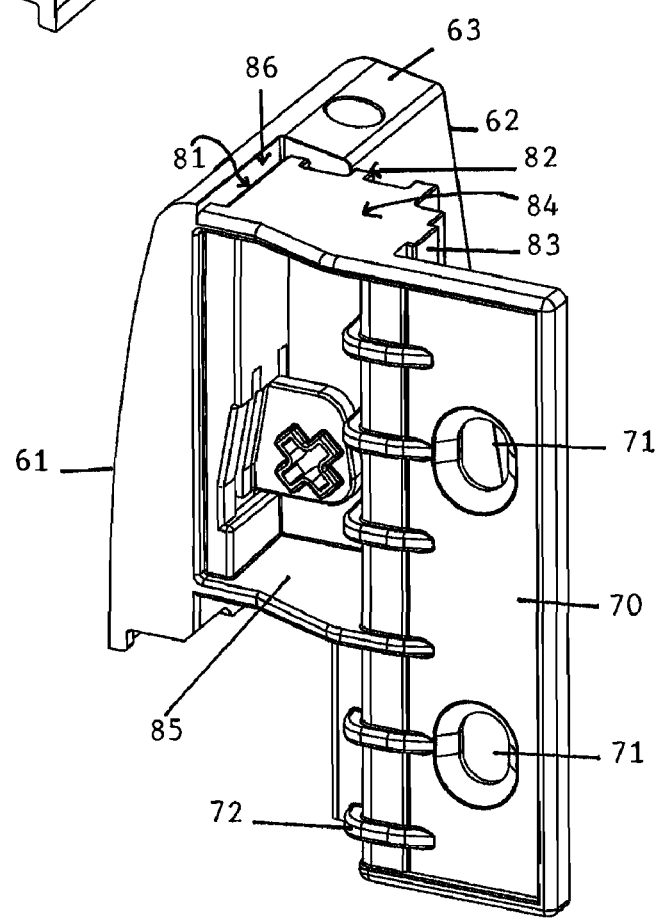
FIG. 3A is a rear perspective view of the corner fitting of an alternative embodiment.
Figure 3B:
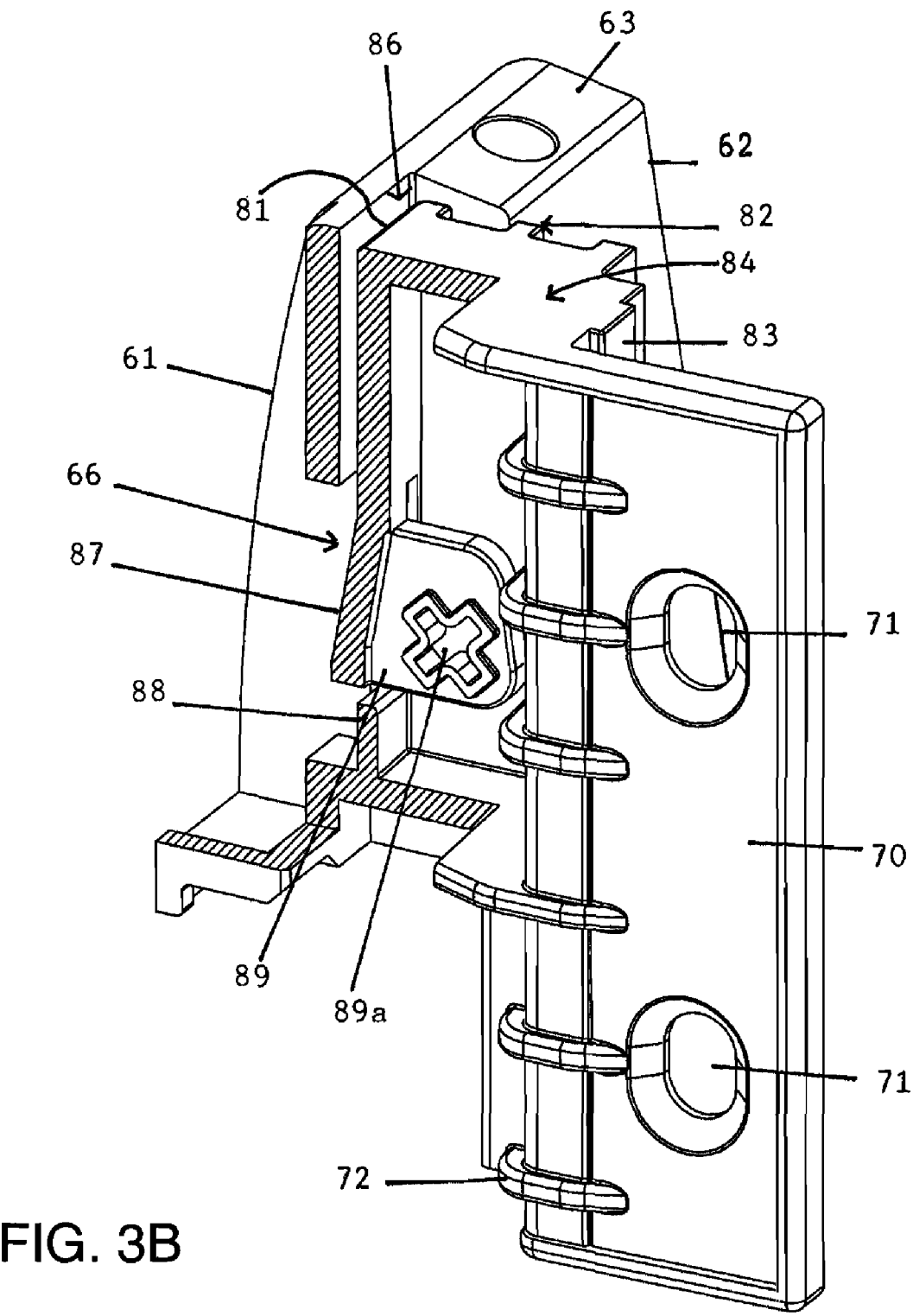
FIG. 3B is a sectional cut-out view of FIG. 3A, showing the location of the locking flap relative to the slot.
Figure 3C:
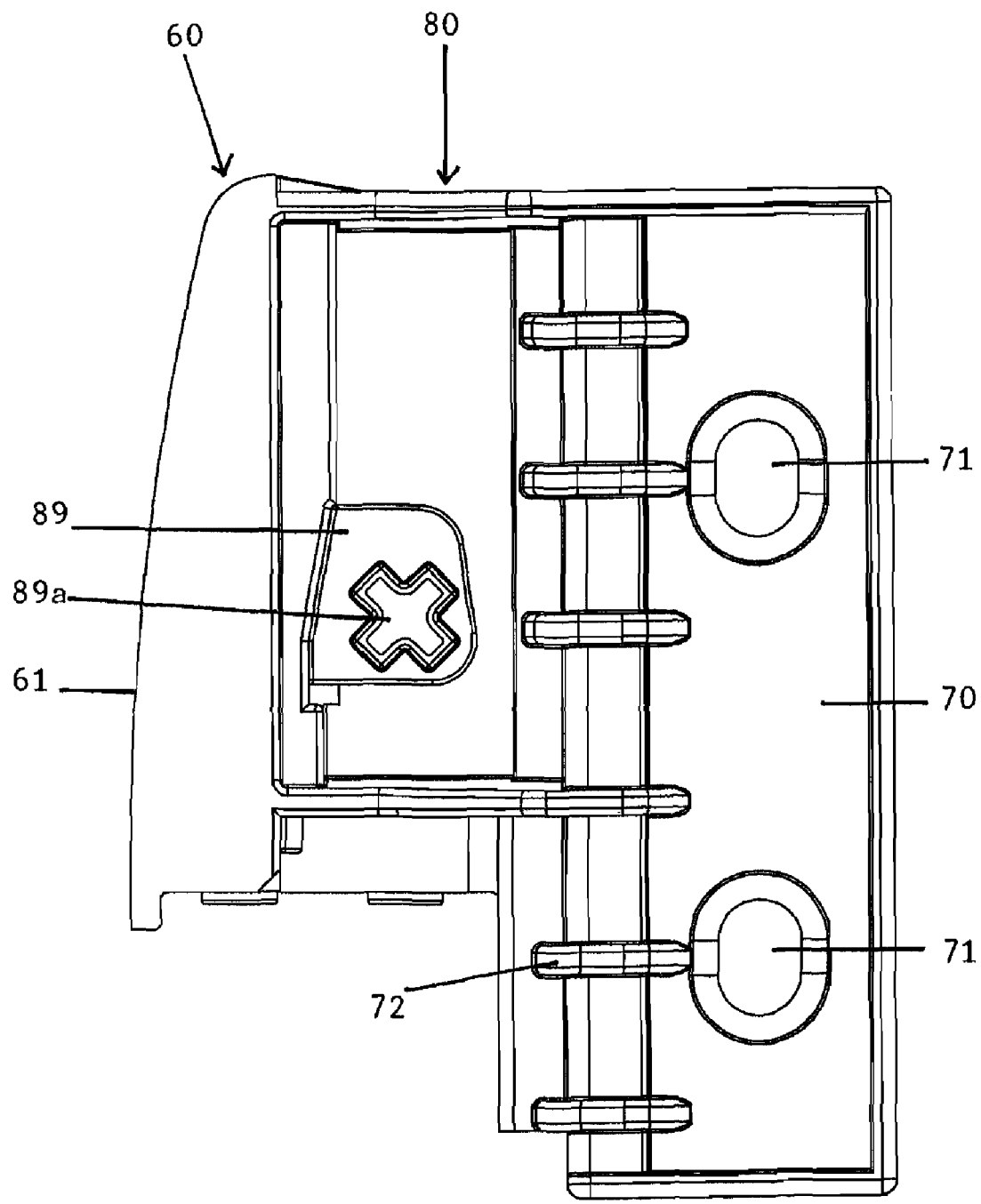
FIG. 3C is a rear view of the corner fitting of FIG. 3A.
Figure 3D:
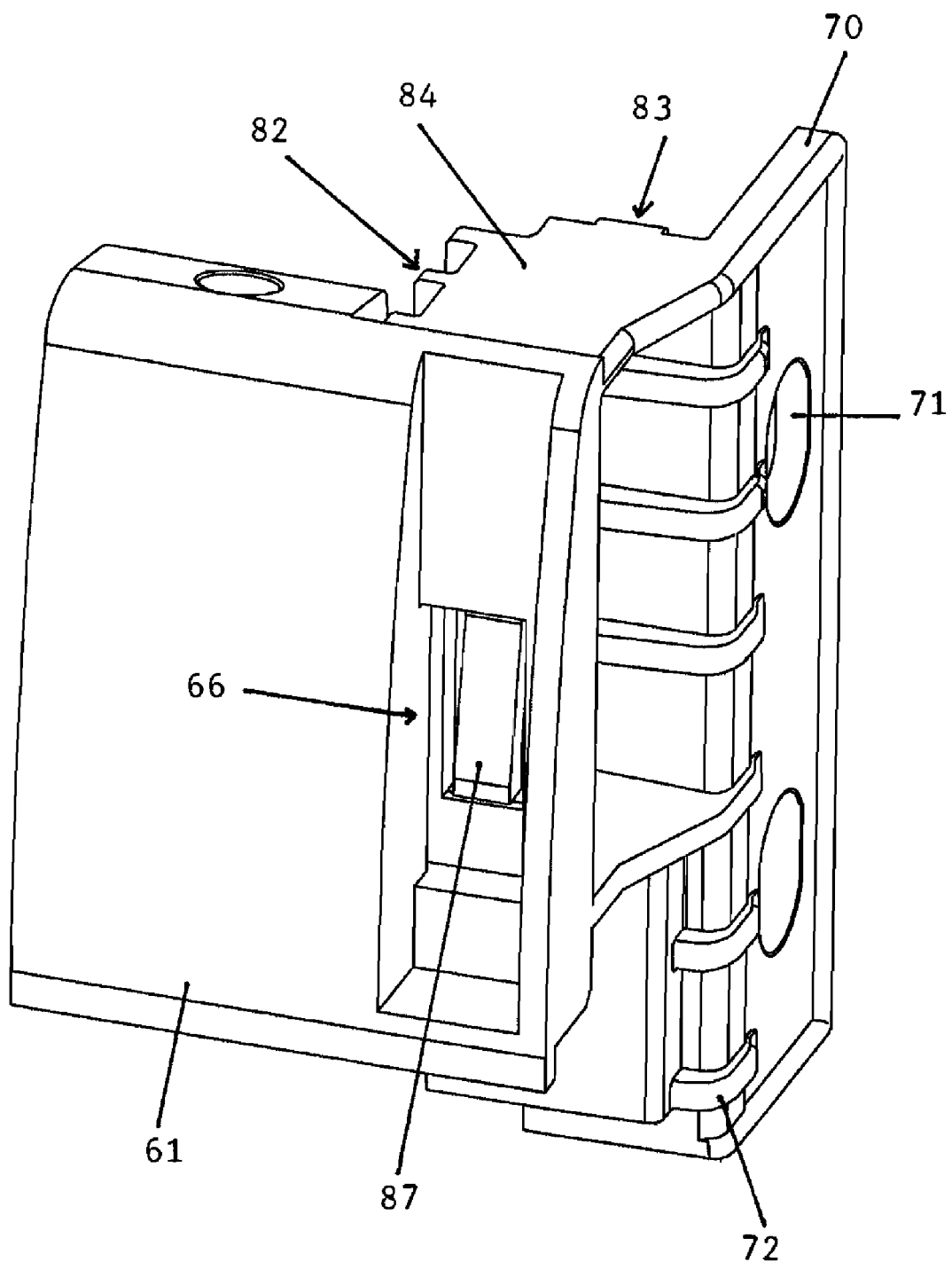
FIG. 3D is an external perspective view of the corner fitting of FIG. 3A.
Figure 3E:
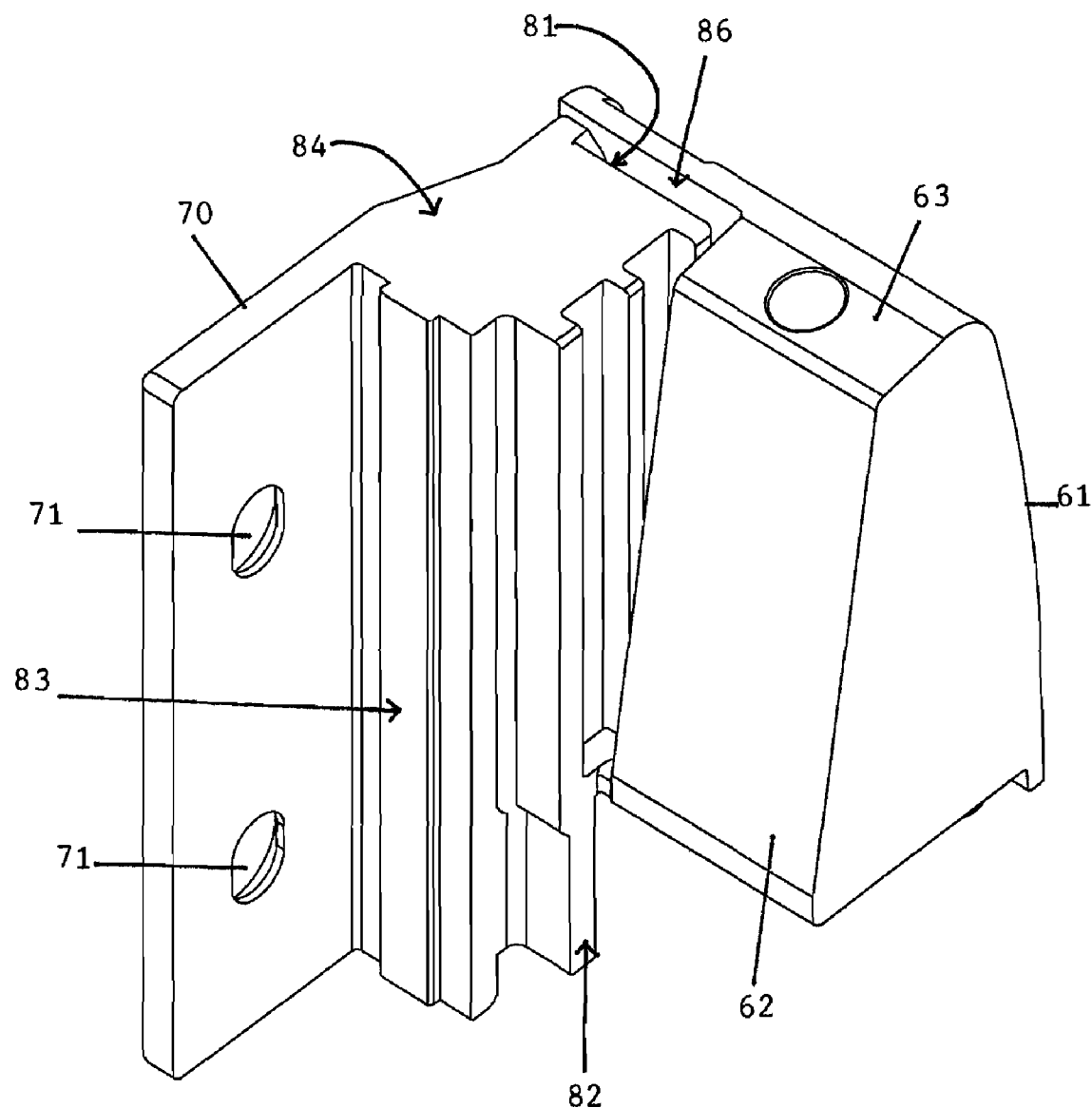
FIG. 3E is an internal perspective view of the corner fitting of FIG. 3A.
Figure 3F:
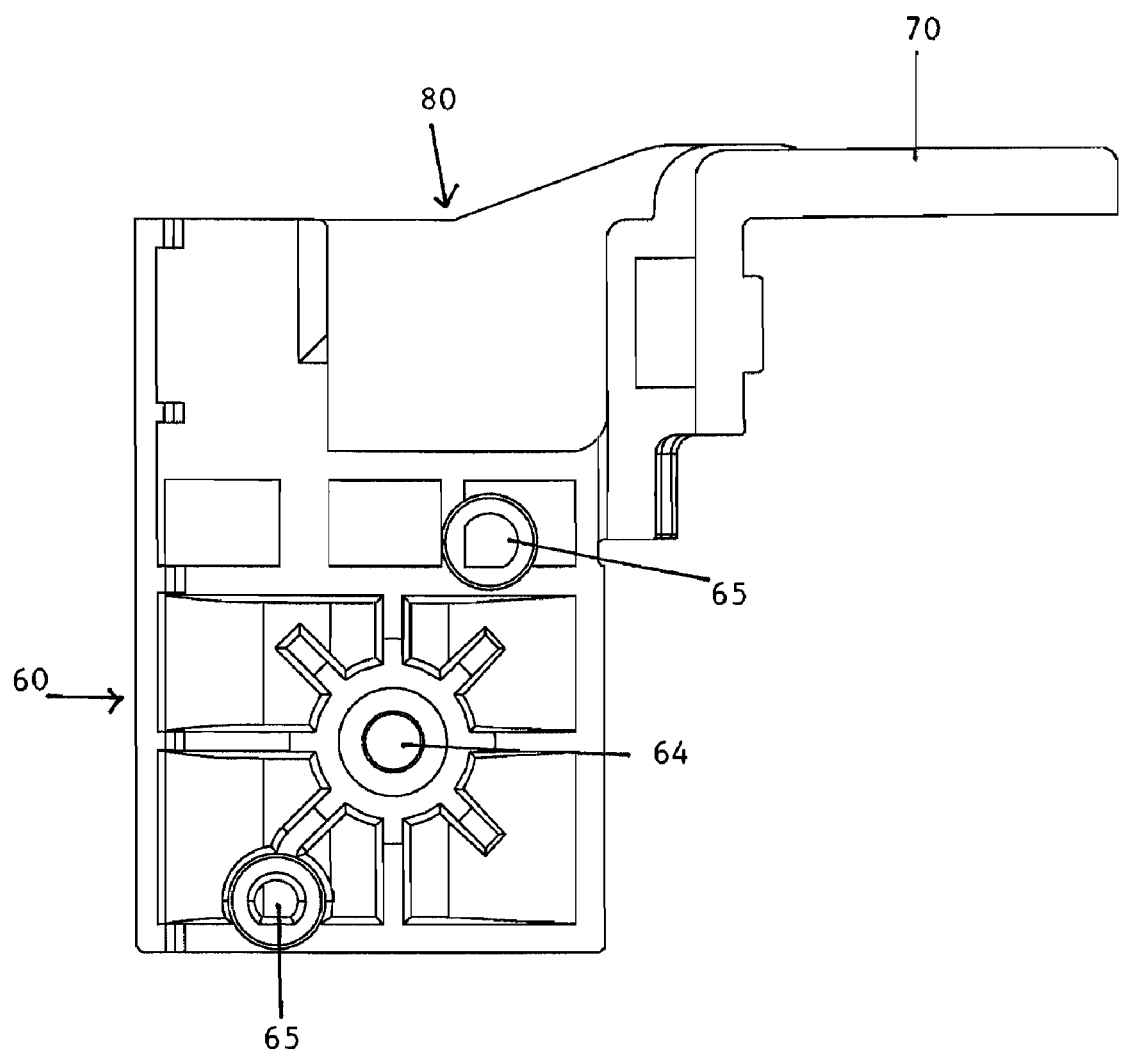
FIG. 3F is a bottom view of the corner fitting of FIG. 3A.

The support structure 80 is oriented such that side wall 81 is adjacent the first flange cut-out and is spaced from the inner face of the first flange outer wall 61. The narrow gap between side wall 81 and the inner face of the first flange outer wall 61 defines a vertical slot 86, within the first flange cut-out. A resilient locking flap 87 is provided on this side wall 81 with the flap biased to protrude into the slot 86 to lock the drawer component inserted into the slot. Preferably, the flap 87 consists of a protruding portion of side wall 81. The lower part of side wall 81, below the flap 87, defines a step 88 on the floor 85 of the support structure recess. A tab 89, accessible through the fourth open side, extends from the flap 87 into the support structure recess. Tab 89 is substantially flat and flexible. It is preferable that a simple extension 89b is provided on tab 89 such that pushing the extension manually, e.g. with a finger, towards second flange 70 would cause tab 89 to flex and in turn cause flap 87 to be retracted from slot 86. This is shown in FIG. 3. Alternatively, as shown in the other figures, an opening 89a, into which a handheld tool may be inserted for retracting the flap 87 from the slot, is provided on tab 89. When a handheld tool such as a screwdriver is inserted into the tab opening 89a and turned, the tab will flex and retract flap 87 from slot 86, as in the preferred mode above. While the opening 89a is shown as cross-shaped, it can obviously take other forms, such as a single slot or a hexagonal outline, according to the tool used.

The second flange 70 is orthogonal and connected to side wall 83 of the support structure 80. At least one opening 71 (and preferably two, as shown) is provided on the second flange 70 for connecting a longitudinal end of the drawer rear panel 40 to the corner fitting 50 by way of fasteners, such as screws. Strengthening ribs 72 are formed at the vertical marginal edge joining the second flange 70 to side wall 83 of the support structure 80.

Figure 4:
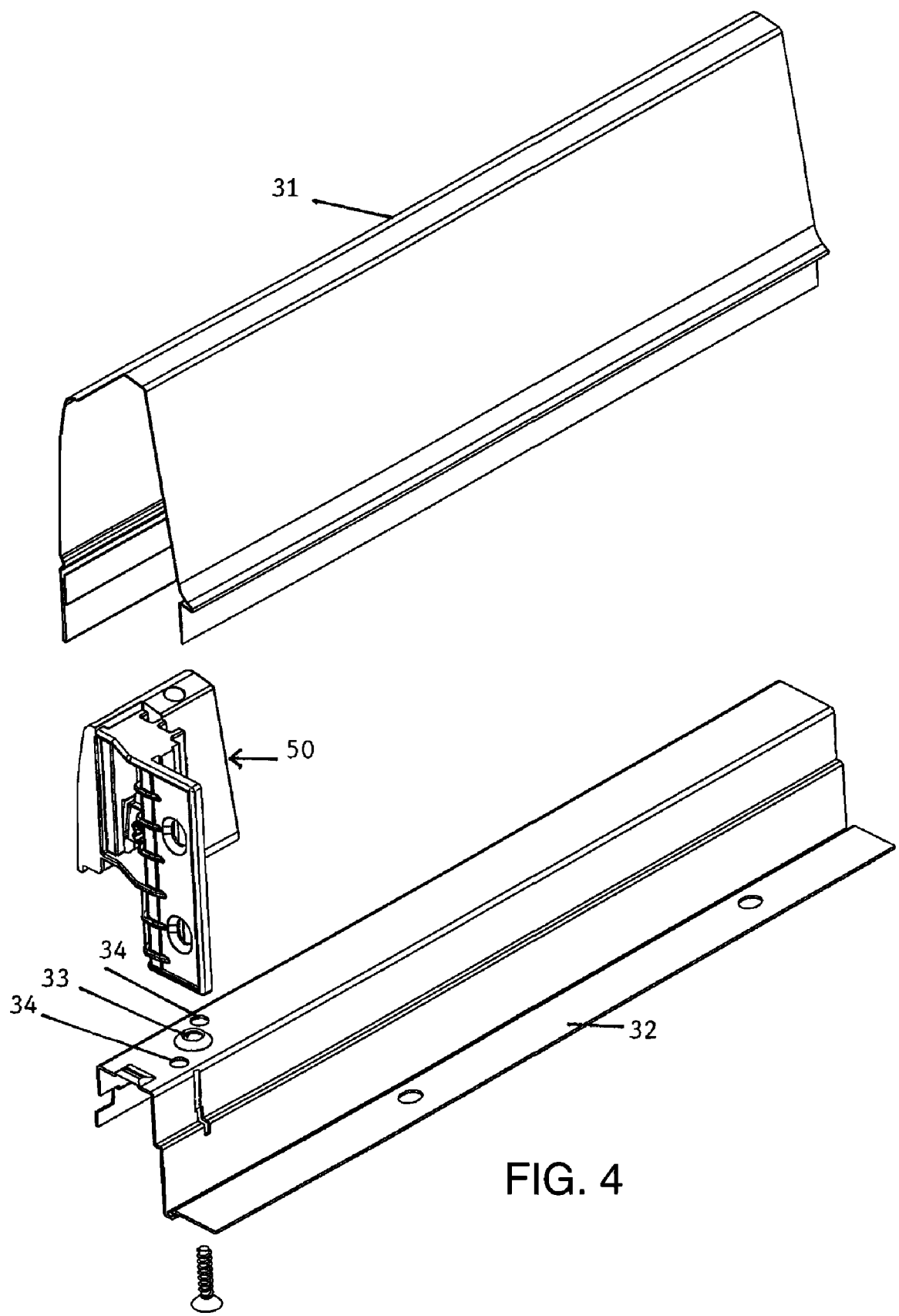
FIG. 4 shows an exploded view of a corner fitting of FIG. 3A being affixed with a drawer side.

In use, as shown in FIG. 4, firstly, the corner fitting 50 is connected with a drawer side 30 by mounting the bracket onto the elongate member 32. The central aperture 64 and locators 65 at the bottom surface of the first flange 60 are aligned with the aperture 33 and holes 34 of the elongate member 32. As the bracket is mounted onto the elongate member 32, the locators 65 fit into the holes 34 flanking the elongate member aperture 33 and the bracket is secured to the elongate member 32 by inserting a screw through the elongate member aperture 33 and the first flange aperture 64. The drawer side cover 31 is then fitted over the elongate member-bracket unit.

Figure 5A:
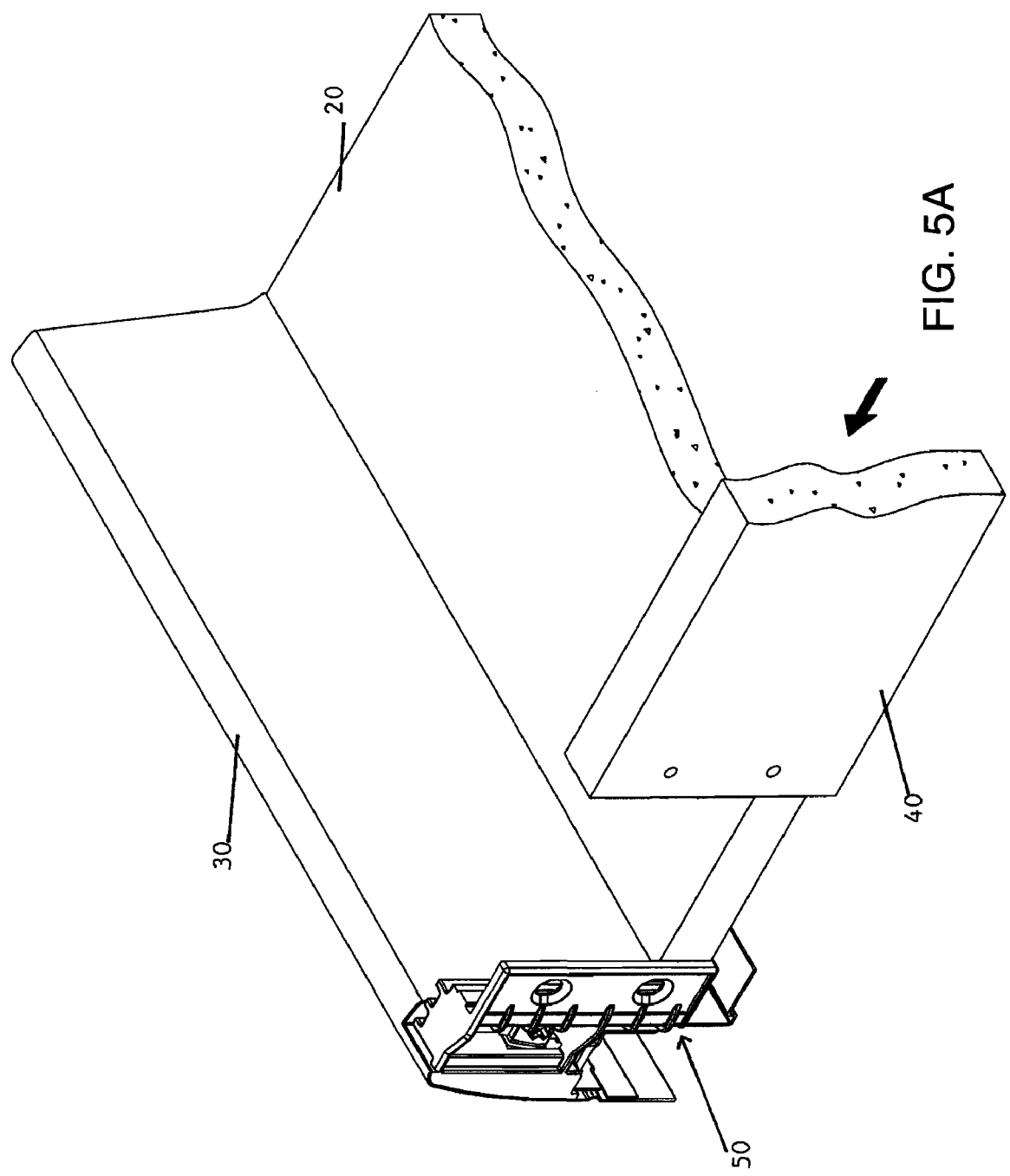
FIG. 5A is a rear perspective view showing the engagement of a drawer rear panel, with a corner fitting of FIG. 3A affixed to a drawer side.
Figure 5B:
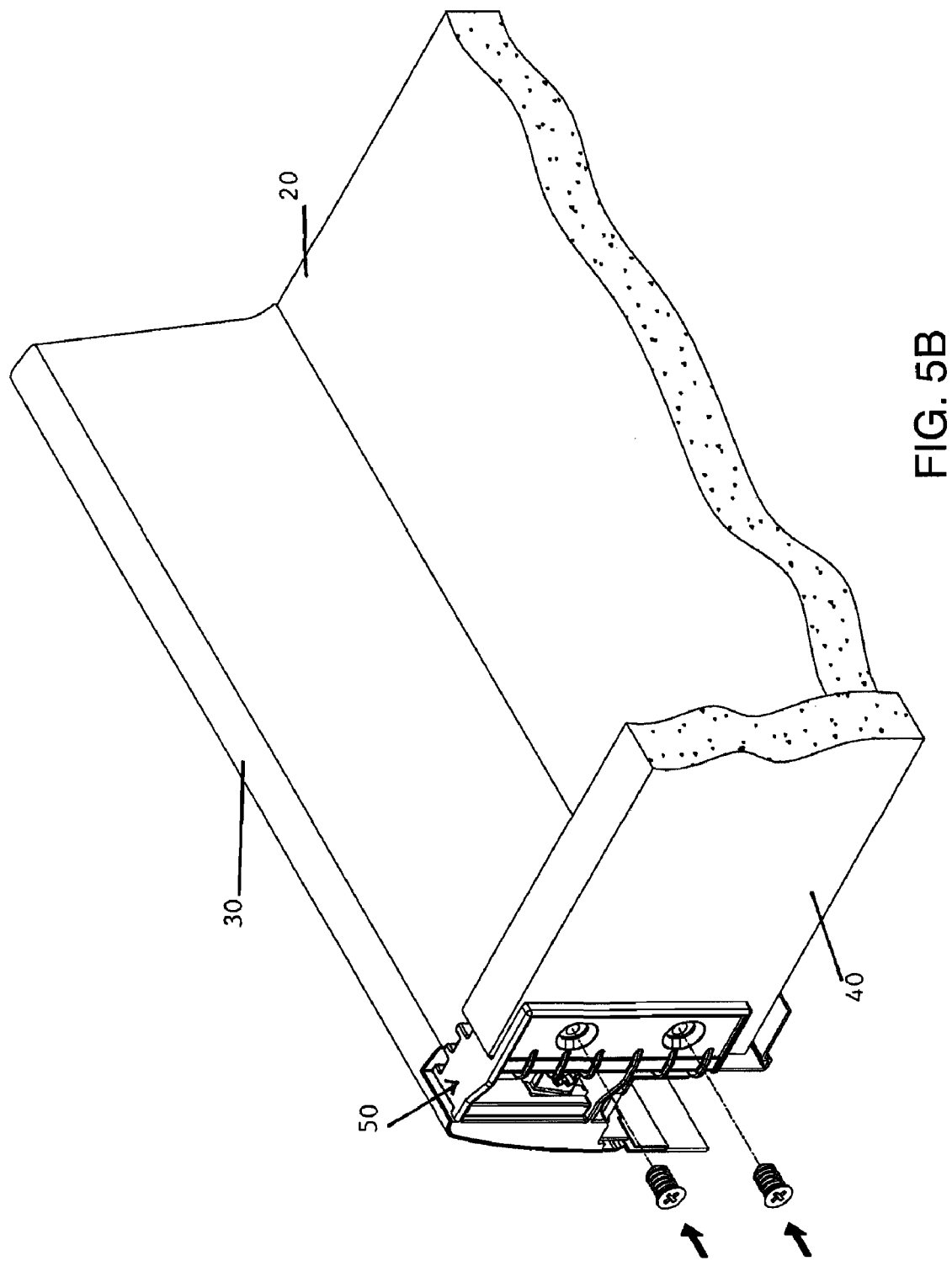
FIG. 5B shows the engagement of the drawer rear panel by way of fastener means.
Figure 5C:
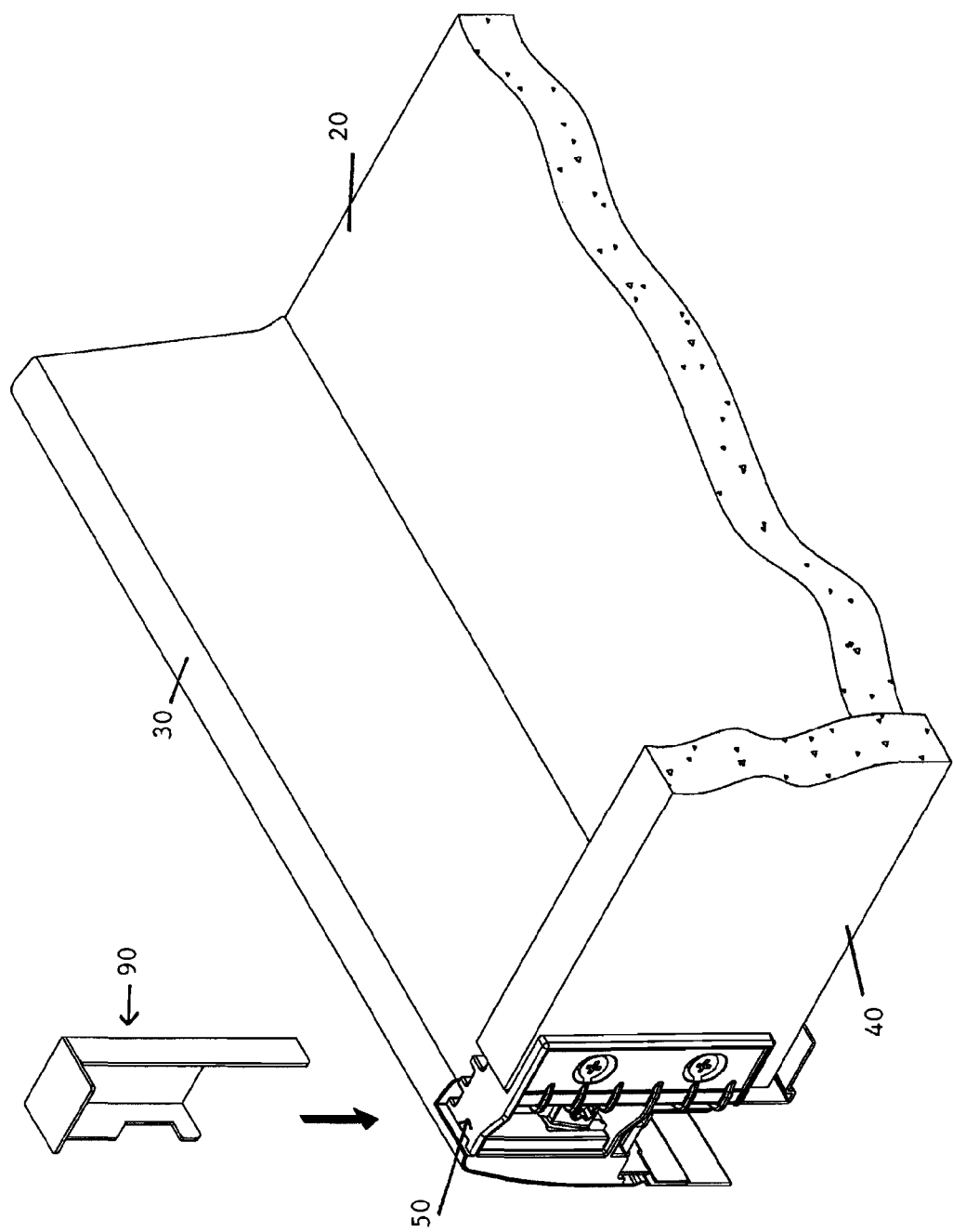
FIG. 5C shows engagement of a cover cap of a first alternative with the assembled corner fitting, drawer side and drawer rear panel of FIGS. 5A and 5B.

Subsequently, as shown in FIGS. 5A and 5B, the drawer rear panel 40 is attached to the corner fitting bracket by way of fasteners inserted through openings 71 of the second flange 70. When engaged thereon, the side wall of the rear panel 40 abuts against the grooved surface of wall 83 of the bracket support structure 80.

A component of the drawer assembly, engageable with the corner fitting 50 of this invention, will now be described.

Figure 6A:
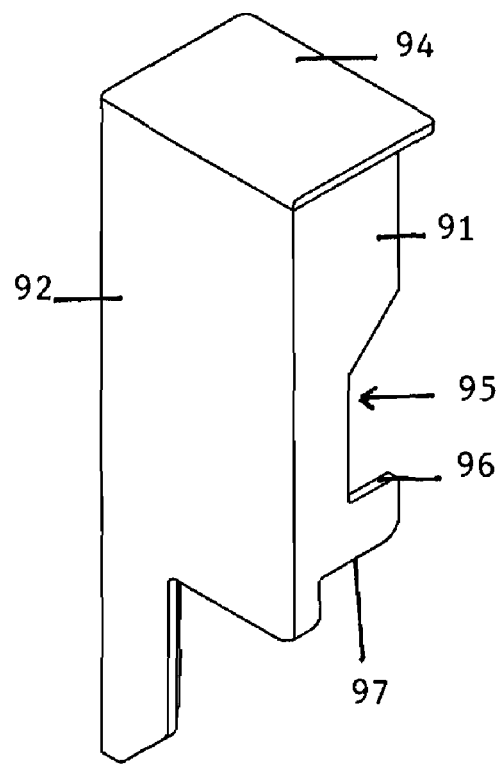
FIG. 6A shows a rear perspective view of a cover cap for use with the corner fitting of FIG. 3A, in a first alternative.
Figure 6B:
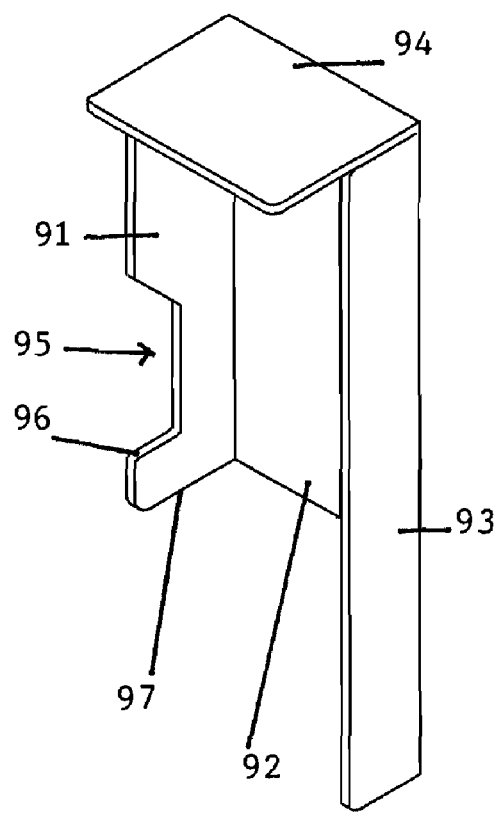
FIG. 6B is a front perspective view of a cover cap of FIG. 6A.
Figure 7A:
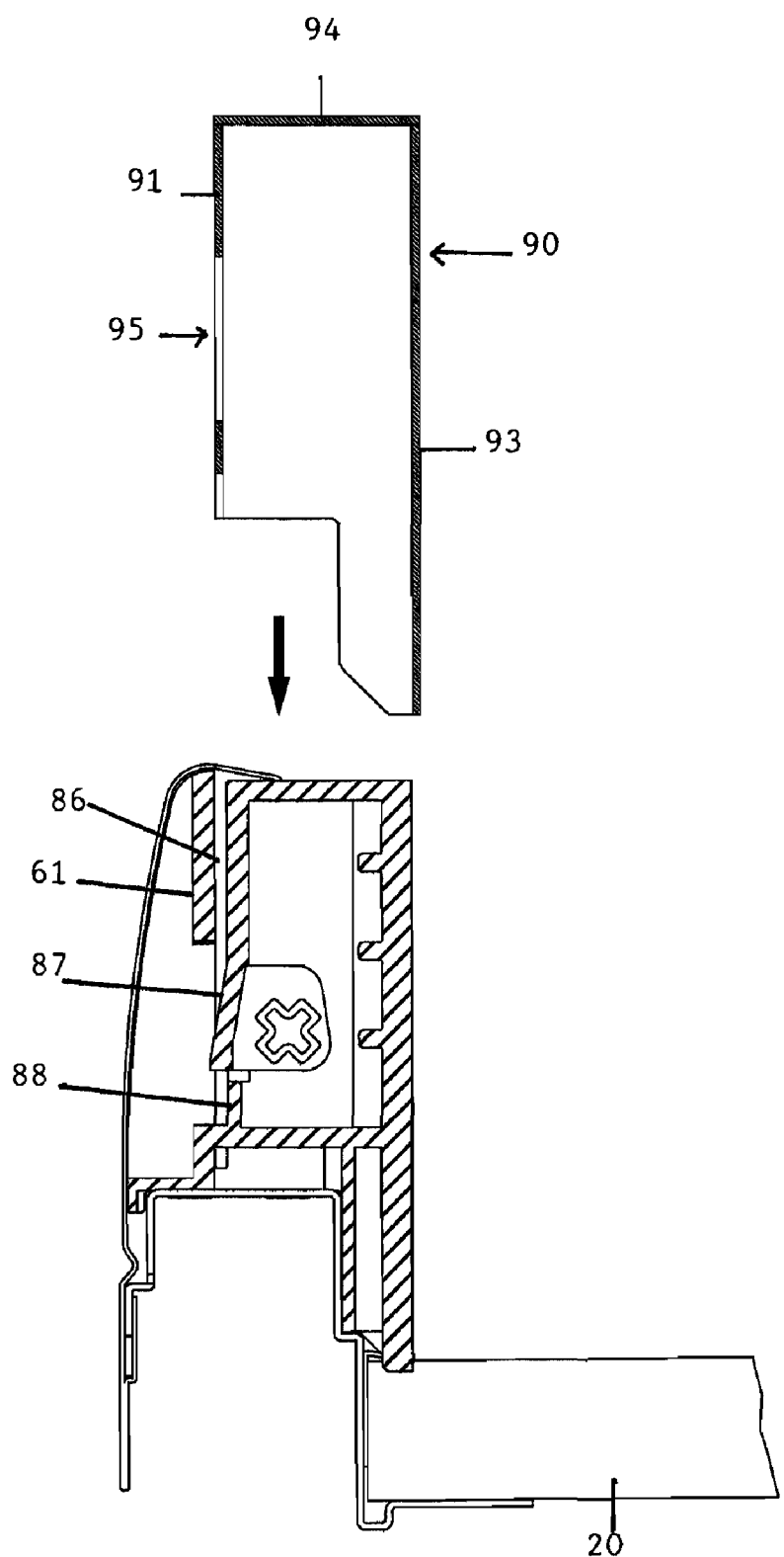
FIGS. 7A, 7B and 7C are rear sectional views showing the insertion of a cover cap of FIGS. 6A and 6B into the slot of a corner fitting of FIG. 3A.
Figure 7B:
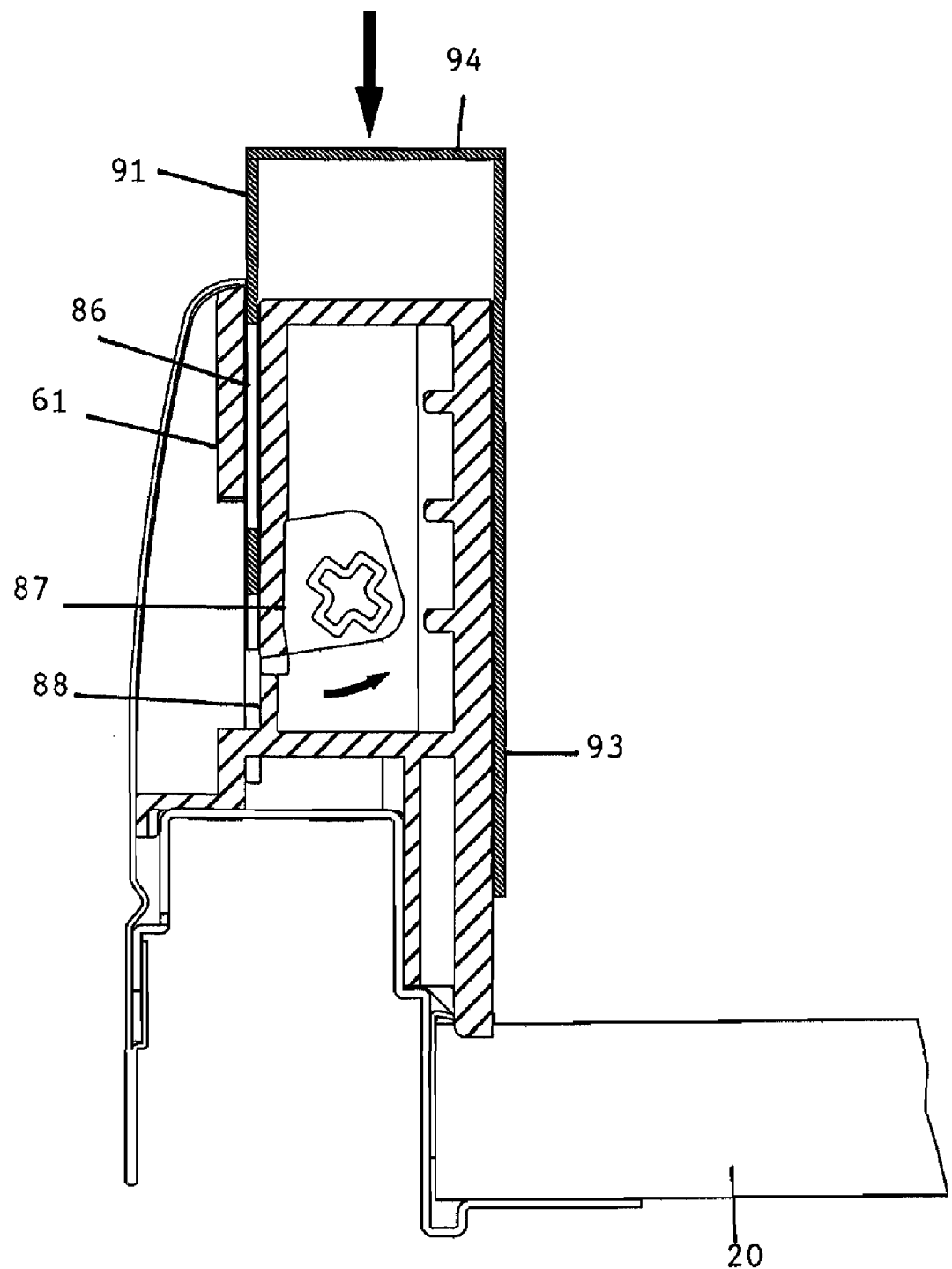
Figure 7C:
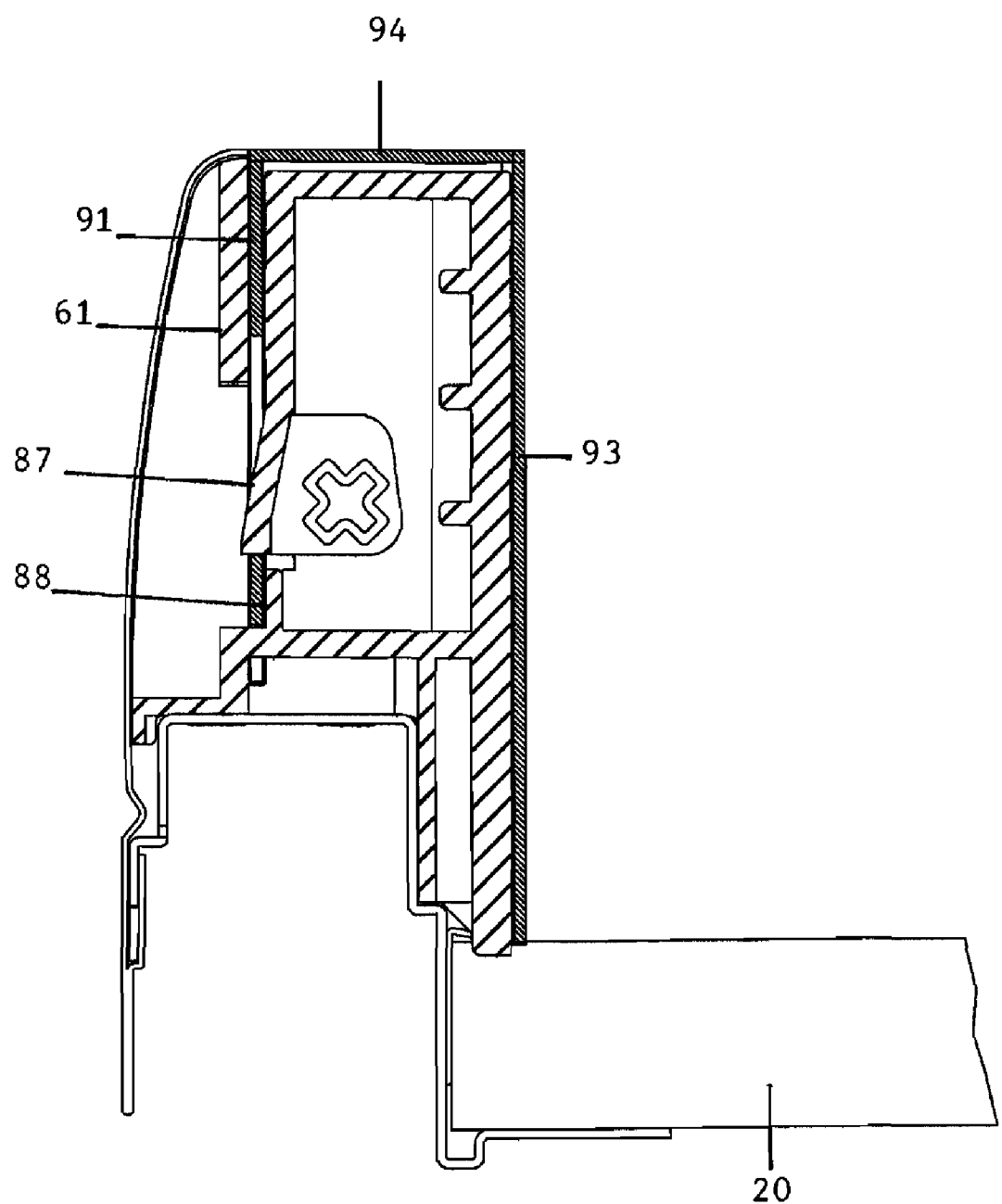

In a first alternative, as seen in FIGS. 6A and 6B, a cap 90, for covering the corner fitting bracket, is provided. The cover cap 90 is preferably made of metal and comprises a top horizontal flange 94 as well as three vertical flanges 91, 92, 93. Vertical flange 91 constitutes a side engagement portion for engagement with the locking flap 87 of the support structure 80, the engagement causing the cap 90 to be interlocked with the bracket. Vertical flange 91 is divided into an upper portion and a lower portion by a notch 95 provided on its vertical free edge. The notch 95 has a lower step edge 96 that is substantially horizontal.

In use, as shown in FIGS. 5C, 7A, 7B and 7C, the vertical flange 91 is inserted into the slot 86 defined between side wall 81 of the support structure 80 and the inner face of the first flange outer wall 61. When vertical flange 91 is pushed down into the slot 86, the lower edge 97 of flange 91 touches the top of the resilient locking flap 87 and deflects it, out of the slot 86, away from the inner face of the first flange outer wall 61 until the flap 87 is disposed in a substantially vertical position. As flange 91 is pushed further into the slot 86 such that the lower edge 97 of flange 91 is pushed pass the flap 87, the flap 87 returns to its original biased position i.e. the flap 87 protrudes into the slot 86. In this position, the lower edge of the flap 87 sits on the lower step edge 96 of flange 91 and prevents flange 91 from being lifted up out of the slot 86. In other words, the flap 87 locks the flange 91 (cover cap 90) within the slot 86. When flange 91 is fully inserted into the slot 86 and locked therein, the lower edge 97 of flange 91 sits on the floor 85 of the support structure 80 and the lower portion of flange 91 abuts against the step 88 (lower part of side wall 81, below the flap 87). The upper portion of flange 91, inner surfaces of vertical flanges 92 and 93 and the horizontal flange 94 of the cover cap, abuts against, the upper part of wall 81, grooved surfaces of walls 82 and 83 and top 84 of the support structure 80, respectively, i.e. the engagement support surfaces of the support structure. Thus, the bracket is covered and hidden from view internally in the drawer assembly by the cover cap 90.

In order to remove the cover cap 90 from engagement with the bracket, the flap 87 needs to be deflected out of the slot 86 to a substantially vertical position. In the preferred mode of tab 89 as seen in FIG. 3, this can be achieved by simply pushing the tab extension 89b with a finger towards second flange 70 so that tab 89 is flexed and consequently, flap 87 is retracted from slot 86. Alternatively, when tab 89 comprises opening 89a (as seen in other figures), a handheld tool such as a screwdriver is inserted into opening 89a and turned. As the tool is turned, the tab 89 is flexed, thereby causing the flap 87 to be deflected out of the slot 86 to a vertical position. The lower edge of the flap 87 is disengaged from the lower step edge 96 of flange 91, freeing flange 91 (cover cap 90) to be lifted up and out of the slot 86.

Figure 8A:
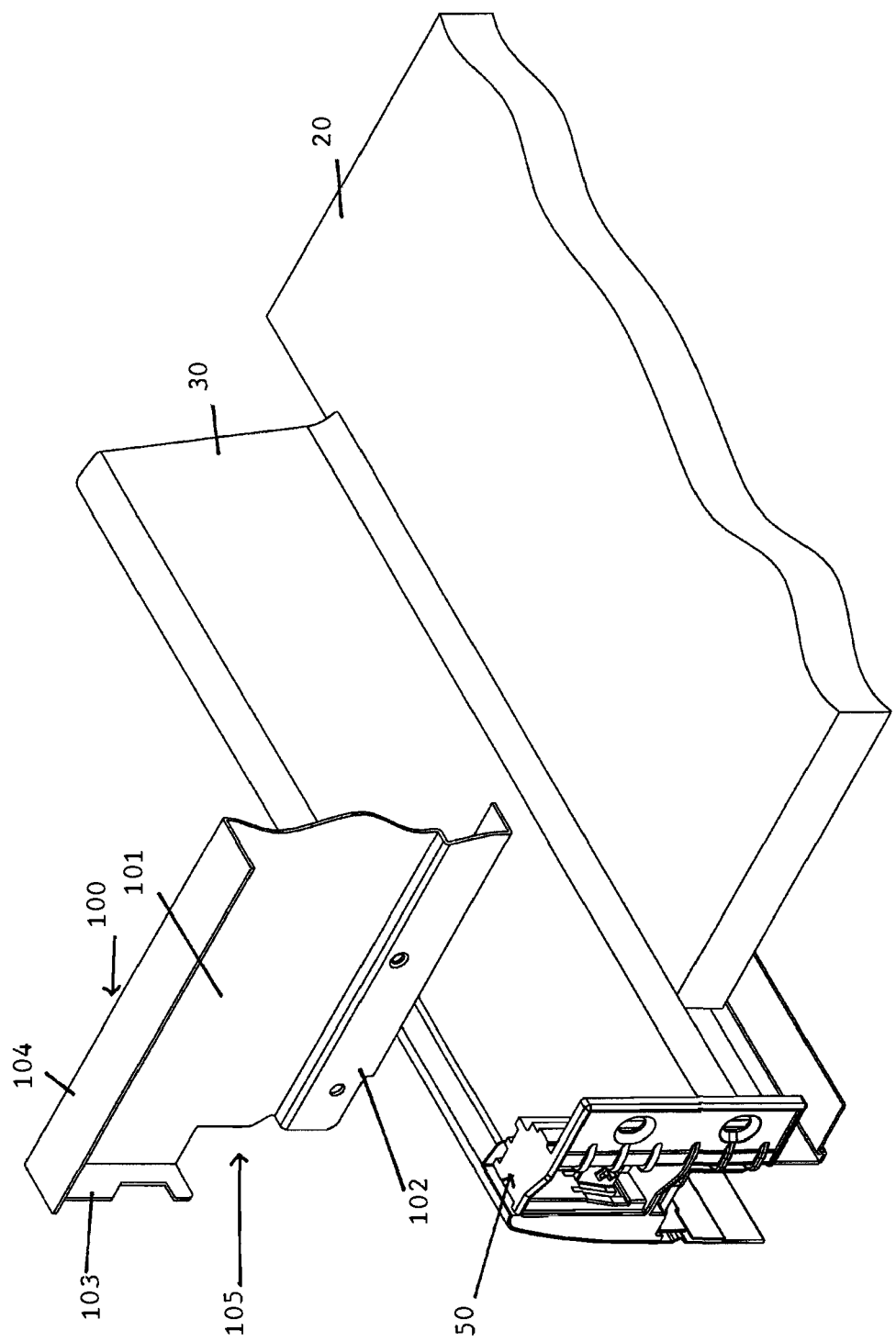
FIG. 8A is a rear perspective view showing the engagement of a drawer rear panel of the second alternative, with a corner fitting of FIG. 3A affixed to a drawer side.
Figure 8B:
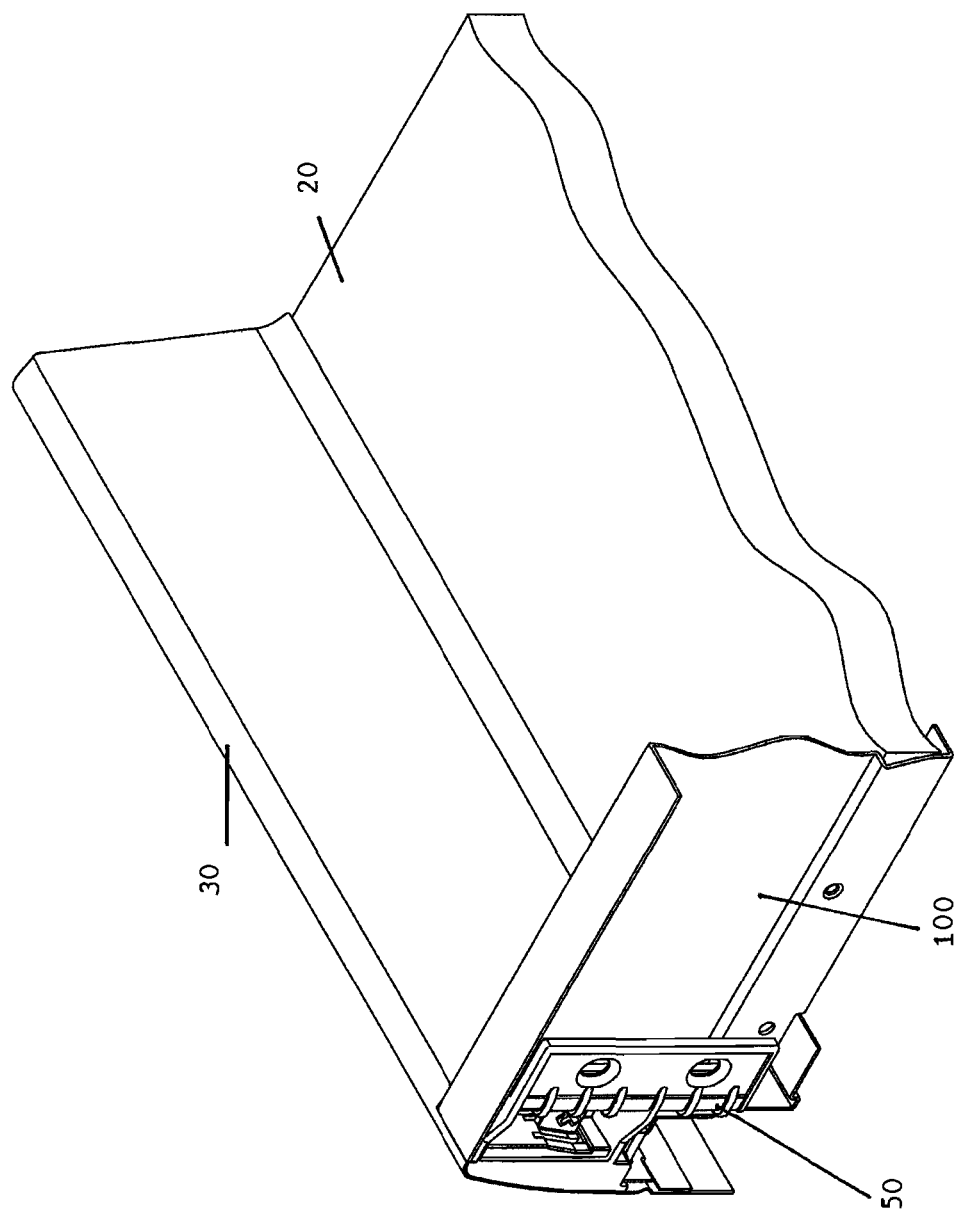
FIG. 8B shows a rear perspective view of the engaged components of FIG. 8A.

In a second alternative, seen in FIGS. 8A and 8B, the drawer rear panel 100 is made from sheet metal, preferably steel. The rear panel 100 comprises a sheet metal member having a top 104, bottom 102 and two side edges 103. The top horizontal flange 104, perpendicular to the rear panel main body 101 and projects rearwardly away from the drawer assembly, is provided at the top edge of the rear panel 100. A bottom slot for receiving the bottom panel of the drawer assembly is provided at the bottom edge 102 of the rear panel main body 101. A cut-out portion 105 is provided at each lower corner of the rear panel main body 101 in order to allow for location of the bracket thereat, when the rear panel 100 is engaged to the bracket. Side flanges 103 that extend rearwardly from the rear panel main body 101 are also provided at each side edge (longitudinal end) of the rear panel 100. These side flanges 103 constitute side engagement portions that are identical to flange 91 of the above-described cover cap 90 and therefore insertable into the slot 86 of the corner fitting bracket in the same manner as flange 91 of the cover cap 90.

When a rear panel side flange 103 is fully inserted into the slot 86, the inner face of the rear panel side flange 103, the rear panel top flange 104 and front face of the rear panel main body 101, abuts against, the upper part of wall 81, the top 84 and the grooved surface of wall 82 of the bracket support structure 80, respectively. As a result, the bracket is covered and concealed from view by the rear panel 100. Also, insertion of both rear panel side flanges 103 into the slot 86 of a respective corner fitting bracket will engage the rear panel 100 to drawer sides 30 via the corner fitting 50 without using fasteners such as screws. Consequently, second flange openings 71 are not used when a drawer rear panel 100 of this alternative is engaged with the corner fitting 50.

Figure 9:
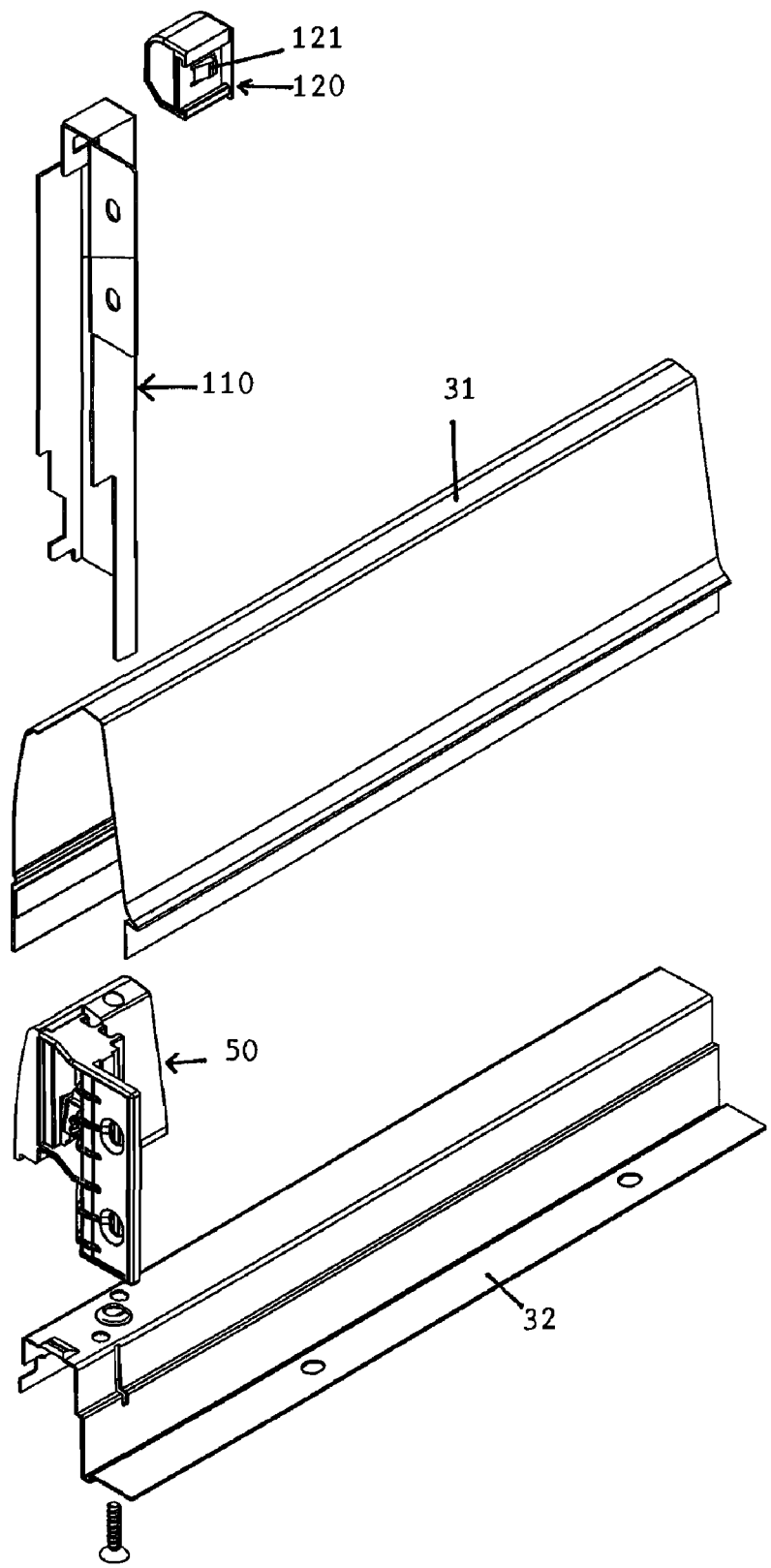
FIG. 9 shows an exploded view of a railing supporter with railing holder of a third alternative and a corner fitting of a preferred embodiment, being mounted onto a drawer side.
Figure 10A:
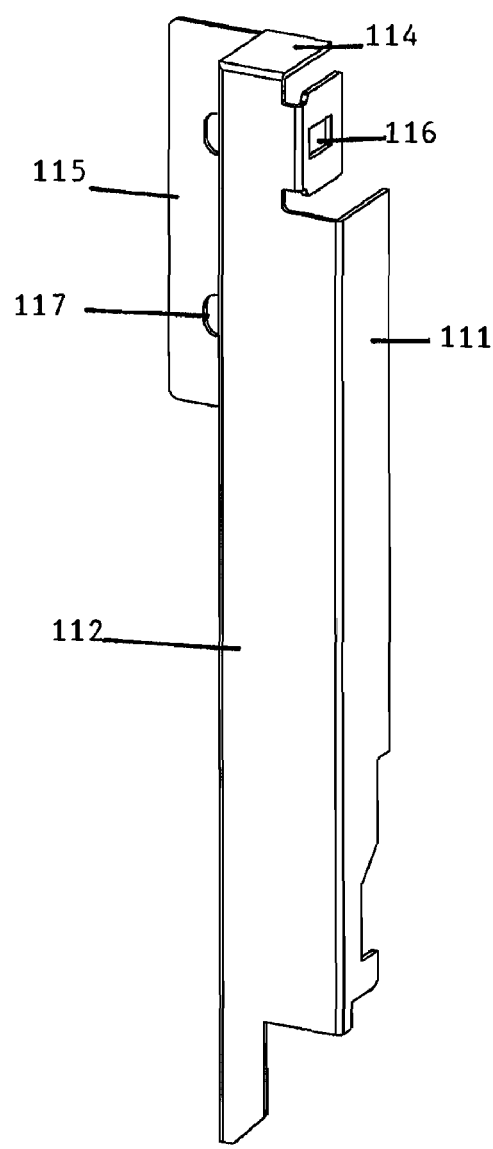
FIG. 10A is a rear perspective view of a railing supporter, for use with the corner fitting of FIG. 3A.
Figure 10B:
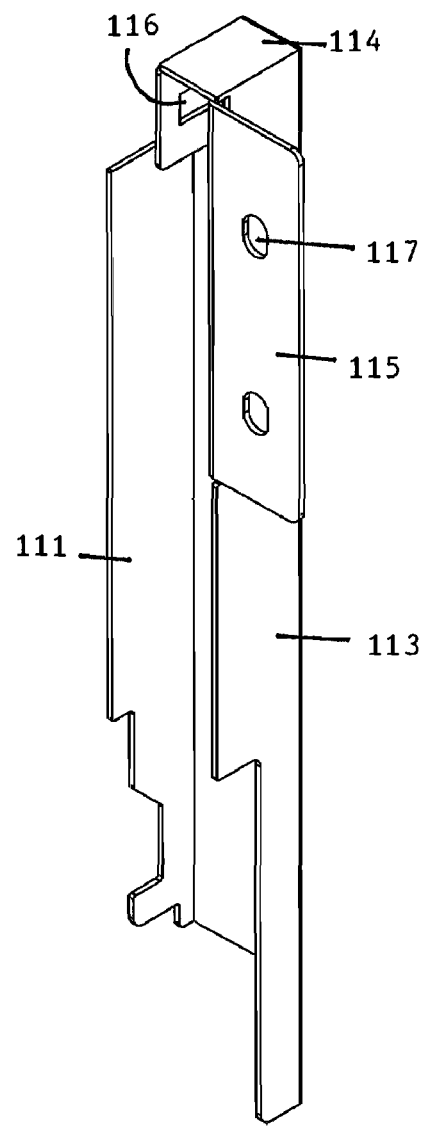
FIG. 10B is a front perspective view of a railing supporter of FIG. 10A.

In a third alternative, a railing supporter 110 and a railing holder 120 are separately provided, as seen in FIGS. 9, 10A and 10B. The railing supporter 110 is preferably made of metal and comprises four vertical flanges 111, 112, 113, 115 and a top horizontal flange 114. Vertical flange 115, orthogonal to vertical flange 113, is provided with at least one opening 117 (and preferably two openings, as shown) for engagement to the rear panel 40 by way of screws. Similar to flange 91 of the cover cap 90 in the first alternative and side flanges 103 of the rear panel 100 in the second alternative, a notch having a substantially horizontal lower step edge is formed at a bottom part of the vertical edge of vertical flange 111. Therefore, vertical flange 111 of the railing supporter 110 is insertable into the slot 86 of the corner fitting bracket in the same manner.

Figure 11:
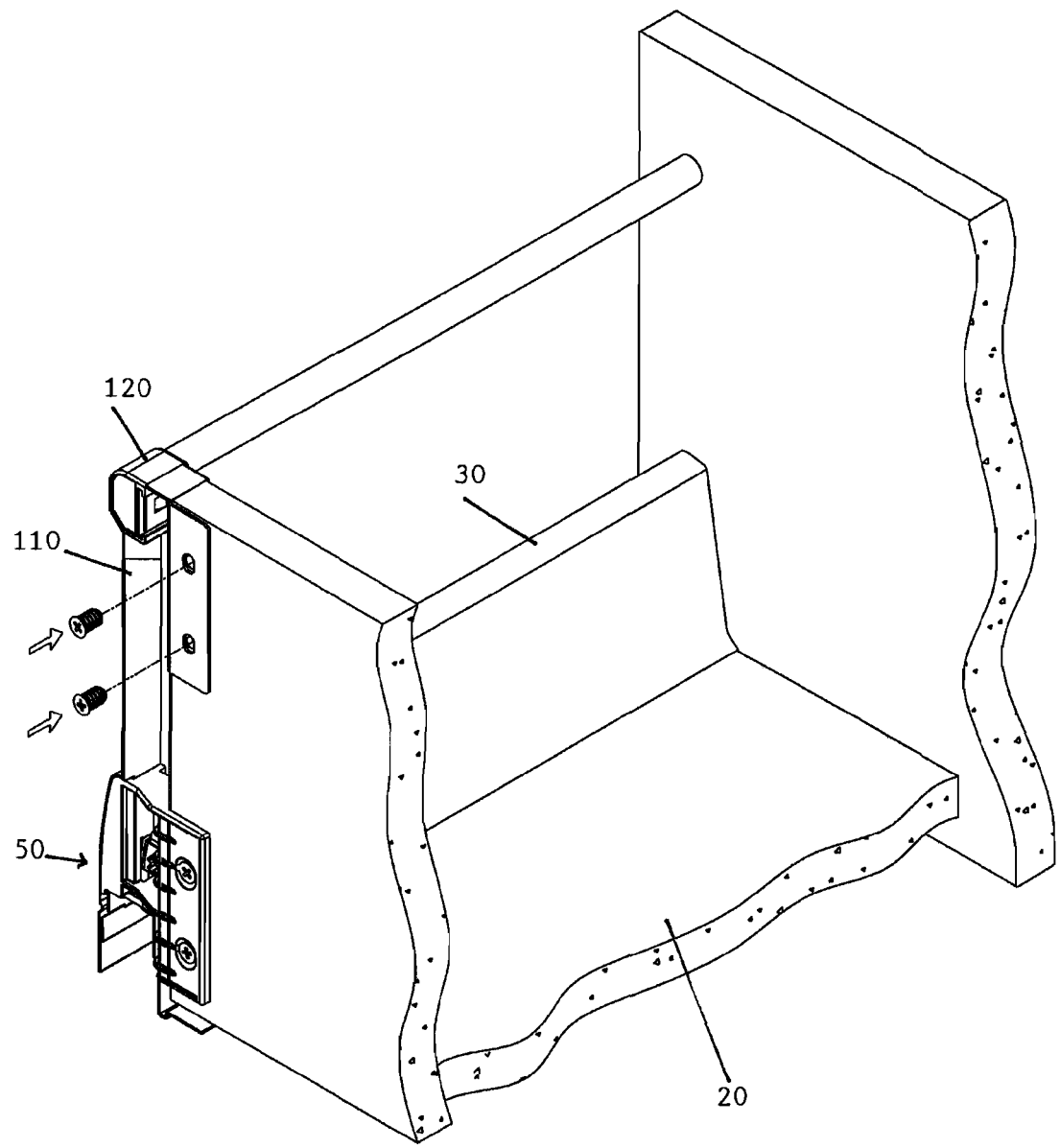
FIG. 11 shows the corner fitting of FIG. 3A having a railing supporter of FIGS. 10A and 10B engaged thereon, assembled in a drawer assembly.

As shown in FIG. 11, when vertical flange 111 is fully inserted into the slot 86, the inner faces of the vertical flanges 111, 112 and 113 and the top flange 114, abuts against, the upper part of wall 81, the grooved surfaces of wall 82 and 83 and the top 84 of the bracket support structure 80, respectively. Therefore, the railing supporter 110 covers and conceals the bracket from view.

Additionally, an aperture 116, for receiving a projection 121 of the railing holder 120, is provided at the top part of vertical flange 111, adjacent the top horizontal flange 114. The railing holder 120, preferably made of plastic, is U-shaped and has a projection 121 insertable into the aperture 116 of the railing supporter vertical flange 111. The railing holder 120 has an internal shape (not shown) that is configured to fixedly hold a railing of the drawer side 30. The internal shape of the railing holder 120 can be cylindrical or non-cylindrical, depending on the external shape of the railing used.

In a further embodiment (not shown in drawings) within the scope of the invention, the bracket support structure is adapted such that the slot, for receiving the drawer component, is parallel with the drawer rear panel 40 and the fourth open side of the support structure opens at a side of the corner fitting (drawer assembly). The side wall of the support structure having the resilient locking flap is disposed parallel with the drawer rear panel 40 and the tab is accessible from a side of the corner fitting (drawer assembly), through the fourth open side of the support structure. Locking of the drawer component within the slot is achieved in the same manner in this embodiment as in the above-described preferred embodiment.

All directional statements such as front/forward, back/rear, top, bottom, lateral, vertical, inward, outward, made herein are relative to the orientation of the drawer assembly, in use.

As will be readily apparent to those skilled in the art, the present invention may easily be produced in other specific forms without departing from its scope or essential characteristics. The present embodiments are, therefore, to be considered as merely illustrative and not restrictive, the scope of the invention being indicated by the claims rather than the foregoing description, and all changes which come within therefore intended to be embraced therein.

The invention claimed is:

1. A corner fitting, for securing a drawer side to a drawer rear panel in a drawer assembly, the fitting comprising:
    a substantially L-shaped bracket having a first flange and a second flange;
        a hollow support structure that connects the first and second flanges and provides internal support surfaces for engagement by a component of the drawer assembly;
        a slot defined by a gap between opposing surfaces of one of said flanges and one of said support surfaces;
        the support structure including a resilient locking flap biased so as to protrude into the slot and configured to lock the component of the drawer assembly; and
        a tab extending from the flap into the hollow support structure and accessible externally of the drawer assembly to permit retraction of the flap from said slot,
        wherein said support structure is concealed by said component on the inside of the drawer assembly, when said component is connected thereto.

2. A corner fitting as claimed in claim 1 wherein the hollow support structure further comprises walls on three sides and a fourth open side through which the tab is accessible.

3. A corner fitting as claimed in claim 2 wherein the fourth open side of the support structure is located between the first and second flanges.

4. A corner fitting as claimed in claim 2 wherein said gap is between the first flange and a side wall of the support structure adjacent the first flange.

5. A corner fitting as claimed in claim 1 wherein the resilient locking flap is provided on a side wall of the support structure.

6. A corner fitting as claimed in claim 1 wherein the resilient locking flap comprises a protruding portion of a side wall of the support structure.

7. A corner fitting as claimed in claim 1 wherein the internal support surfaces for engagement by said component of the drawer assembly are provided by side walls of the support structure.

8. A corner fitting as claimed in claim 1 wherein the tab further comprises an extension that is depressible manually for retracting the flap from the slot.

9. A corner fitting as claimed in claim 1, wherein the tab further comprises an opening into which a handheld tool may be inserted for retracting the flap from the slot.

10. A corner fitting as claimed in claim 1 wherein the bracket is adapted to be oriented such that the first flange is parallel with a drawer side and the second flange is parallel with the drawer rear panel.

11. A corner fitting as claimed in claim 10 wherein the first flange further comprises an opening provided on its bottom surface for connecting the bracket with a drawer side.

12. A corner fitting as claimed in claim 10, wherein the second flange further comprises at least one opening through which a fastener, for connecting the bracket with a longitudinal end of the drawer rear panel, can pass.

13. A corner fitting as claimed in claim 1, wherein the bracket is adapted to be oriented such that the first flange is parallel with the drawer rear panel and the second flange is parallel with a drawer side.

14. A corner fitting as claimed in claim 13, wherein the second flange further comprises an opening provided on its bottom surface for connecting the bracket with a drawer side.

15. A corner fitting as claimed in claim 13, wherein the first flange further comprises at least one opening through which a fastener, for connecting the bracket with a longitudinal end of the drawer rear panel, can pass.

16. A corner fitting as claimed in claim 1 wherein the bracket is made of plastic material.

17. A corner fitting as claimed in claim 16 wherein the bracket is a single molded piece.

18. A drawer assembly including a rear panel and two drawer sides, each side joined to one longitudinal end of the rear panel by a respective corner fitting as claimed in claim 1.

19. A drawer assembly as claimed in claim 18 wherein the drawer rear panel is made of wood.

20. A drawer assembly as claimed in claim 18 wherein the drawer rear panel is made of sheet metal.

21. A drawer assembly as claimed in claim 18 wherein the assembly further comprises railing supporters and railing holders.

22. A drawer assembly as claimed in claim 18 wherein the component of the assembly engagable with the support structure comprises a cap for covering the corner fitting.

23. A drawer assembly as claimed in claim 18 wherein the component of the assembly engagable with the support structure comprises the drawer rear panel.

24. A drawer assembly as claimed in claim 18 wherein the component of the assembly engagable with the support structure comprises a railing supporter.

25. A drawer assembly as claimed in claim 18 wherein the drawer side is double-walled.

26. A drawer assembly as claimed in claim 18 wherein the drawer side comprises a cover portion that fits over an elongate member.

* * * * *